United States Patent [19]

Suggs, III

[11] Patent Number: 4,667,969

[45] Date of Patent: May 26, 1987

[54] PACKING MATERIALS FOR SHAFT SEALS

[75] Inventor: James W. Suggs, III, Snellville, Ga.

[73] Assignee: Klinger, A.G. Zug, Zug, Switzerland

[21] Appl. No.: 891,872

[22] Filed: Jul. 30, 1986

[51] Int. Cl.⁴ ............................................. F16J 15/22
[52] U.S. Cl. .................................... 277/230; 277/233;
277/DIG. 6
[58] Field of Search .................. 277/227, 229–232,
277/203, DIG. 6

[56] References Cited

U.S. PATENT DOCUMENTS

| | | | |
|---|---|---|---|
| 1,161,213 | 11/1915 | Headson | 277/230 X |
| 2,157,867 | 5/1939 | Robertson et al. | 277/230 X |
| 2,667,684 | 2/1954 | Boyer et al. | 277/230 X |
| 2,716,034 | 8/1955 | Main | 277/230 X |
| 3,404,061 | 10/1968 | Shane et al. | 277/DIG. 6 X |
| 3,791,658 | 2/1974 | Zumeta et al. | 277/230 |

*Primary Examiner*—Robert S. Ward
*Attorney, Agent, or Firm*—Abelman Frayne Rezac & Schwab

[57] ABSTRACT

A packing material for shaft seals includes a resilient and flexible core of longitudinally braided yarns of discrete filaments, the core having been compressed into the form of a cylinder of substantially rectangular cross-section and in which the yarns are free of bonding agents in order to provide for relative movement of the filaments relative to each other within the core, the core having at least one winding on its outer surface of a graphite foil tape having its edges arranged in overlapping relationship to provide a continuous covering on the core, the outer covering on the core being secured thereto by a layer of adhesive.

11 Claims, 2 Drawing Figures

PACKING MATERIALS FOR SHAFT SEALS

FIELD OF THE INVENTION

This invention relates to packing materials for use in the sealing of rotary or reciprocatory shafts, and while not limited thereto, particularly relates to packing materials for use in pumps, valves or motors operating at elevated temperatures and at elevated pressures.

BACKGROUND OF THE INVENTION

Seals for rotary or reciprocatory shafts, are well known in the art in which packing material is confined within and compressed within a sealing gland surrounding the shaft, the purpose of the packing material being to prevent seepage of fluids in a direction longitudinally of the shaft from a high pressure zone at one side of the gland to a low pressure zone, or atmosphere, at the opposite side of the gland. Further, particularly in high temperature and high pressure valve applications, such seals are required to withstand elevated temperatures, and pressures from 750 P.S.I. and up to 4200 P.S.I., commonly encountered pressures being in the range of 2800–3200 P.S.I., this requiring that the seals be highly resistive to thermal distortion or destruction. Commonly, such seals are required to withstand temperatures in the order of 900° F. when exposed to ambient air, and, temperatures of the order of 1,200° F. in applications handling live steam.

A multitude of different materials have been proposed as packing materials for shaft seals, including natural fibers such as cotton or wool, or inorganic fibers such as asbestos, glass fibers, rock wool, and carbon or graphite fibers, either in compacted form, or, when the form of woven materials, such materials typically being impregnated with bonding agents. While such materials can perform satisfactorily under certain conditions, invariably they are subject to one or more disadvantages such as attrition by abrasion at the rotating or axially reciprocating surface of the shaft, or, due to thermal destruction or rapid aging at elevated temperatures. Further, if the packing materials are comprised of fibrous materials, then, the interstices between the fibers permit leakage through the body of the packing material itself, thus resulting in objectionable leakage and pressure losses.

U.S. Pat. No. 3,404,061 issued Oct. 1, 1968, teaches a material for use in substitution for fibrous materials, and which is now commonly known in the art as "Grafoil". This material is an expanded graphite formed by expanding graphite particles of natural or synthetic origin by a factor of at least 80 times in the "C" crystallographic axis dimension, and then compressing the expanded particles to form a cohesive structure. A full description of the method of making expanded graphite is to be found in the said U.S. Patent.

One common usage of such material is in the formation of shaft seals by winding a length of a flexible tape formed from expanded graphite onto a mandrel to form a solid annulus of the required dimensions for filing the packing gland of the shaft, followed if desired by a pressing operation to size the formed annulus to close tolerances.

The formed annulus is then positioned around a shaft to be sealed and within the confines of the sealing gland, and is compressed in an axial direction to bring it into the required sealing relationship with the outer periphery of the shaft to be sealed.

While such seals perform admirably under favorable conditions, they are less than successful in their performance under adverse conditions, resulting from poor condition of the associated equipment, such as, scarred, galled, or pitted shafts or valves stems, particularly in situations in which they are subjected to both high temperatures and also high pressures. Such conditions, particularly at high pressures, can result in extrusion of the expanded graphite material in a direction longitudinally of the shaft, with consequential loss in the sealing ability of the seal.

Further, any eccentricity of the shaft caused by wear in its bearings can cause asperities at the interface of the shaft and seal, this resulting in particle transfer at contact points and resulting in volumetric reduction of the graphite material of the seal, again with a loss in the sealing ability of the seal.

As the seal itself is comprised by a substantially rigid and inflexible member having little resiliency, there is the further problem of the seal working or cold flowing under the forces exerted thereon by the rotating or reciprocating shaft, with the consequence of either an increase in the internal diameter of the seal, and consequential leakage, or, the inner periphery of the seal being distorted out of the round and again, promoting leakage past the seal.

It has been prior proposed in Nixon U.S. Pat. No. 4,116,451 issued Sept. 26, 1978 to incorporate a metal core member into such seals in order self energize the seals and to impart to them a degree of flexibility and resiliency, and in order to overcome the disadvantages mentioned above. Such prior proposals have proved to be only partially successful in overcoming the problems involved, in that they are of insufficient resiliency, or, they are prone to fatigue under periods of extended use.

An alternative and highly successful approach to these problems has been in the employment of seals formed from braided yarns of natural or inorganic fibers. Such materials possess all of the required characteristics of resilience and conformability, but, are hampered with several major disadvantages, particularly when used in high-pressure environments.

One of these is the lack of structural integrity of such braided materials such arises from breakage and attrition of the fibers used in the yarns from which the braided seal material is fabricated, and which results from direct frictional contact with the periphery of the shaft.

Further, and when exposed to compressive forces of 2–5 times the system pressure such as is required to establish initial sealing pressure, the fibers can become crushed and broken with a consequential loss in sealing ability of the seal even prior to the associated equipment being put into service.

Also, only a relatively small number of fibers are in actual contact with the outer periphery of the shaft, and those particular fibers must absorb all of the forces imposed on the seal by the angular or linear displacement of the shaft relative thereto.

These problems result in relatively rapid destruction of the seal, particularly in the event that the seal is used in pumps for pumping fluids having discrete particles of abrasive material entrained therein, for example, in the pumping of slurries, or in the pumping of air suspensions of abrasive particulate material.

The other problem arises from the foraminous nature of the braided packing material, which provides for leakage directly through the body of the seal, this problem limiting the use of such seals to relatively low pressure applications.

SUMMARY OF THE INVENTION

It is an object of this invention to provide a seal having all of the desirable characteristics of both the solid forms of expanded graphite seals and the braided forms of seals as discussed above, while minimizing or eliminating the disadvantages of the prior art constructions.

According to the present invention, the packing material is comprised of a resilient and flexible core of longitudinally braided yarns of discrete filaments, the core having been compressed to form a cylinder of substantially rectangular cross-section, such that it can readily be cut and formed into an annulus.

The yarns comprising the braided core are free of bonding agents, this permitting movement between the respective fibers relative to each other within the core, and resulting in a core structure that is readily conformable, and which possess a high degree of resilience, the bending of the core into annular form resulting in the development of hoop stresses in the core and a compressive force acting to urge the inner periphery of the core radially inwardly in a resilient manner. In this way, biasing of the inner periphery of the annulus into engagement with the outer periphery of the shaft is provided for.

The outer surface of the core is provided with one or more windings of expanded graphite foil tape, the winding of the tape or successive layers of tape each having their longitudinal edges arranged in overlapping relationship to provide a continuous covering on the core. The tape is adhered to the outer surface of the core by an adhesive layer, which conveniently is applied to the graphite foil tape prior to or during the winding thereof on the core. In the event that more than one winding of graphite tape is provided on the core, then, preferably the windings are of opposite hand. Also, preferably, the graphite foil tape is one which has been transversely pleated in order to reduce or eliminate the possibility of the layer of graphite foil tape cracking or flaking as the core is moved into annular formation.

Preferably, the core initially is formed axially straight, both in order to facilitate its manufacture, and also, to facilitate the subsequent winding therearound of the graphite foil tape.

Suitable lengths of the packaging material are then cut from the bulk material with end faces arranged at corresponding angles, the cut lengths then being formed into an annulus with the respective ends arranged in mating relationship.

Subsequent to its formation into annular form, the seal thus formed can be compressed to size and set its shape. During this operation, the graphite foil tape is forced into the interstrices bween the discrete fibers to plug and fill the interstices, thus forming an outer skin on the formed seal that provides a fluid or gas impervious barrier, thus precluding subsequent seepage of fluid through the body of the seal when it is employed in pressurized environment.

While the yarns formed from said fibres can be combed or calendered fibers formed into the yarns by twisting, the yarns also can be formed from lengths of an unbonded scrim formed from said fibres on a conventional felting loom.

DESCRIPTION OF THE DRAWINGS

The invention will now be described with reference to the accompanying drawings, which illustrate a preferred embodiment of the packing material of the present invention falling within the scope of the appended claims, and in which:

DESCRIPTION OF THE PREFERRED EMBODIMENT

Figure 1:
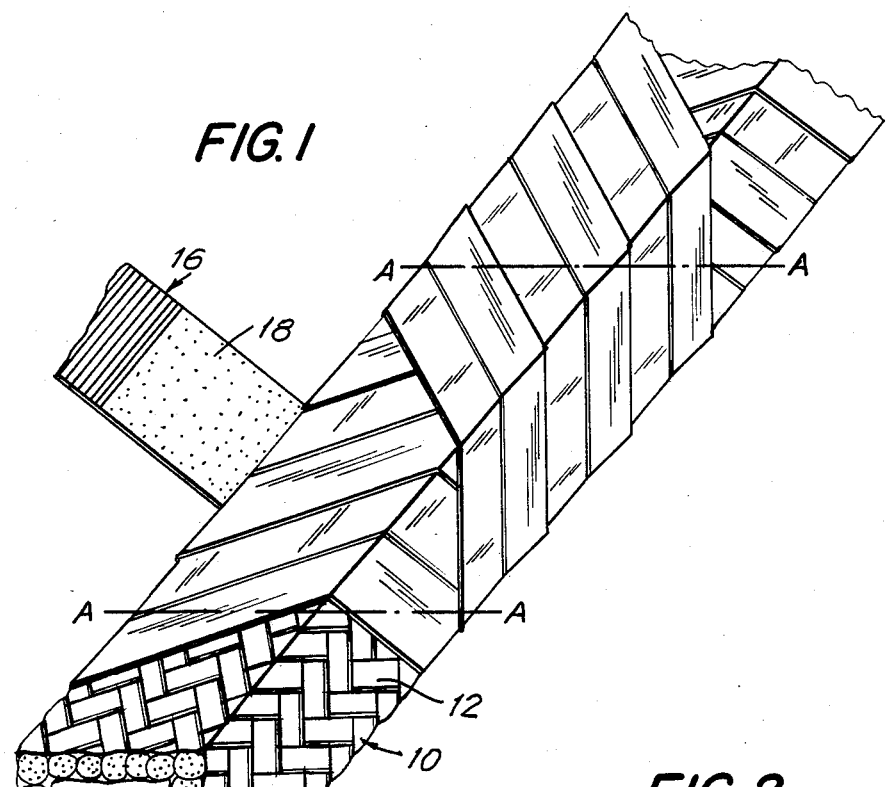
FIG. 1 is a perspective view of the packing material of the present invention showing various stages in the assembly thereof.

Referring firstly to FIG. 1, the packing material of the present invention consists of a core 10 which is formed from braided yarns 12 of graphite fibers.

In its initially braided form as it leaves the braiding machine, which may be of any conventional construction, the core 10 will be of generally circular form, particularly in the event that the braiding proceeds in the absence of a rectangular core mandrel.

Subsequent to the braiding of the core 10, it is then compressed by any suitable apparatus (not shown) to bring the core 10 into substantially rectangular bar-like form as shown in FIG. 1.

The fibers comprising the yarns used in the braiding each are free of bonding agents and the like such that the respective fibers are capable of moving relative to each other within the core, this facilitating the formation of the core into substantially rectangular cross-section, and also, imparting to the core a relatively high degree of compliancy and resiliency, such that the core has an inherent tendency to return to the dimensions of its rectangular cross-section in the event that the core is subject to compression in a lateral direction.

Extending continuously around the outer surface of the core 10 is a winding of expanded graphite foil tape 14, the edges of the tape being arranged in overlapping relationship so as to form a continuous fluid impervious barrier on the outer surface of the core. Optionally, and also as illustrated in FIG. 1, a second winding of expanded graphite foil tape 16 can be provided on the outer surface of the expanded graphite foil tape 14, the hand of winding of the tape 16 being opposite to that of the tape 14. Preferably, the tape 14, and also the tape 16 if employed in the construction, is of transversely pleated form, such that it has the capacity of being elongated when subjected to loads in the longitudinal direction, the lateral dimension of the tape being substantially fixed.

Prior to winding onto the core 10, the tape 14, and optionally the tape 16 is coated on its face presented to the core with a layer of an adhesive 18 compatible with the materials of the fibers of the core and the expanded graphite foil tape. During the winding, a slight tension is applied to the tape 14 and to the tape 16 if employed, to bring the adhesive coating of the tape into intimate contact with the fibers at the outer faces of the core 10. If desired, the extent of the adhesion can be increased by subjecting the axial sides of the core to compression, such as by passing the wrapped core through sizing rollers (not shown).

The assembled packing material is then cut into appropriate lengths for forming into a seal, the cut lines extending diagonally across one pair of opposed faces of the assembled packing material, and at identical angles as indicated by the lines A—A in FIG. 1.

Figure 2:
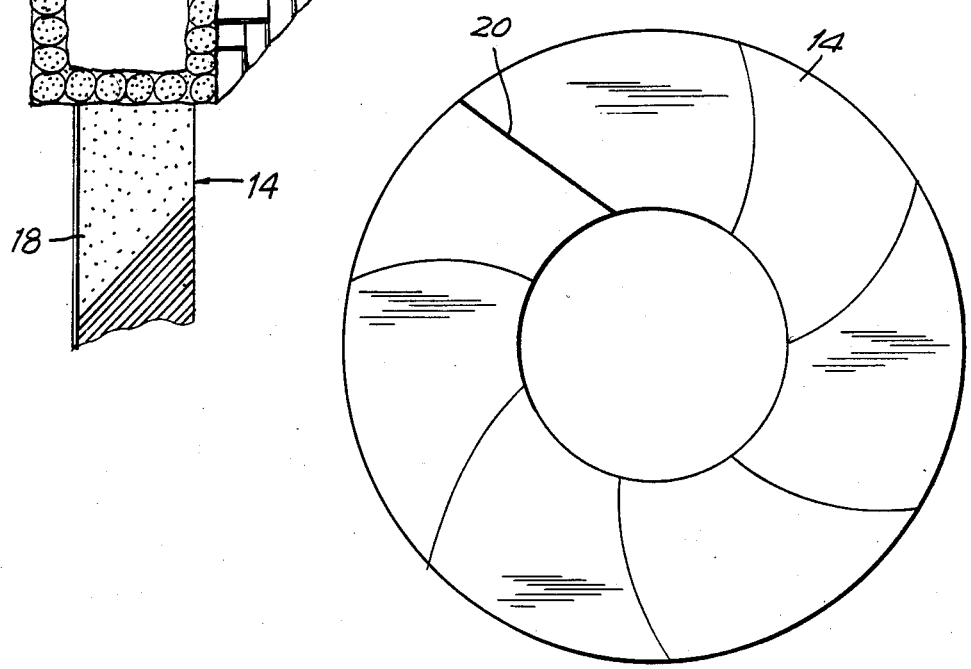
FIG. 2 is an axial view of a seal assembled from the packing material of FIG. 1.

The cut length of packing material is then moved into circular formation as shown in FIG. 2. This can be done either manually, in that the packing material is inherently compliant, or, can be done with a mechanical assist such as by passing it through a conical forming die and into a sizing die. The cut ends of the packing material during this operation move into mating engagement, as indicated at 20 in FIG. 2. The thusly formed annular seal can then be sized by subjecting it to compression, this operation resulting in the expanded graphite material of the tape 14 being forced into the interstices between the fibers of the yarns of the core 10 to effectively calk the interstices, and thus provide a fluid impervious barrier surrounding and adhesively attached to the core 10. The resultant seal will then have the appearance of a solid annulus of graphite having an outer surface polished to the extent of finishing of the sizing die.

By employing expanded graphite foil tape that has been transversely pleated, problems of flaking of the graphite foil tape from the surface of the core and cracking of the foil are eliminated to the greatest possible extent, the graphite foil tape having the capability of elongating and contracting in concertina fashion as the packing material is moved from its axially straight condition to its final substantially circular condition.

As the packing material has an inherent tendency to return towards its axially straight condition, preferably, the formed seal of FIG. 2 is confined within a tube of plastics material, or provided with some suitable form of garter at the time it is removed from the sizing die.

In view of the braided tubular construction of the core 10, the forming of the packing material into the seal of FIG. 2 will result in a tensile hoop stress at the outer periphery of the formed seal, the core member 10 having only extremely limited capability of axial elongation, and, will result in corresponding compressive stresses in the body of the seal which act in a radially inward direction. Thus, the construction of the core 10 results in an inherent proclivity of the formed seal of FIG. 2 to expand radially inwardly at its inner periphery, the outer periphery thereof being confined against outwards expansion. This radially inwardly acting compressive force coupled with the compliancy and resiliency of the packing material has the beneficial effect of automatically adjusting the diameter of the inner periphery of the seal to the outer periphery of the shaft with which it is to be associated within limits far exceeding those provided by seals of solid section formed from expanded graphite foil tape, this minimizing any tendency for axial seepage along the outer periphery of the associated shaft.

Further, in use of the seal, the expanded graphite material constituting the tape becomes further compacted into and polished into the interstices between the fibers of the yarns, this further increasing the effectiveness of the fluid impervious barrier provided by the expanded graphite material of the tape.

In this manner, a seal is provided that can accommodate "bounce" in the shaft to be sealed, and which can arise due to wear in the bearings of the shaft. Further, the seal can accomodate lateral displacements of the shaft, such as can occur due to wear in the support bearings of axially reciprocatable shafts. Due to the inherent compliancy and resiliency of the packing material, it can readily recover from ovalisation of its central bore caused by pressure exerted thereon by a stationary shaft, and which is the consequence of the stationary shaft having moved laterally in the event that its support bearings are worn. Further, the expanded graphite material of the tape is inherently self-lubricating, whether in the presence of a lubricant such as oil or water, or in the absence of such a lubricant, the graphite of the tape in essence having been matrixed within the fibers at the outer surfaces of the seal, the fibers acting to hold the expanded graphite material against axial or circumferential displacement within the inner periphery of the seal, and in so doing, minimize crumbling of the expanded graphite material, such as can occur in solid seals formed from expanded graphite foil tape. Still further, the packing material of the present invention can be manufactured at far lower costs than can be its counterpart formed from expanded graphite foil tape, the braided core 10 being far less expensive to manufacture than the expanded graphite foil tape.

While yarns of graphite fibers are preferred for most high pressure and temperature applications, fibers of other materials can be used in the formation of the core as dictated by the ultimate use of the seal. For example, natural fibers such as flax, ramie, jute and the like can be used alone or in admixture either with each other or in admixture with inorganic fibers such as glass, ceramic, or fibers of plastics materials, including fibers of carbon or graphite materials, the former having a carbon content of up to 98.2% and usually 95%, the latter having a carbon content in excess of 98.2%.

The yarns can be those formed by a conventional twisting operation in which the filaments are oriented uniaxially, or conveniently the yarns can be cut lengths of an unbonded scrim of said fibers in which the fibers are distributed randomly.

It will be appreciated that the embodiments discussed above are preferred embodiments falling within the scope of the appended claims, and, that various alternative embodiments are contemplated, including those of forming the core 10 for it to be other than of substantially rectangular cross-section. For example, and if desired, the core 10 can be formed to be of trapezoidal cross-section, or, formed with its faces to be presented radially in the assembled seal for them to be concavely or convexly curved, including any combinations of flat or curved side surfaces of the packing material, such as are dictated by the ultimate use of the seal to be formed from that material.

I claim:

1. Packing material for use in the formation of the shaft seals, comprising:
    a resilient and flexible core of longitudinally braided yarns of discrete fibers, said core having been compressed to form a cylinder of substantially rectangular cross-section, said yarns being free of bonding agents and providing for relative movement of said fibers relative to each other within the body of said core;
    a winding on the outer surface of said core of an expanded graphite foil tape, the winding of said tape having edges thereof arranged in overlapping relationship to provide a continuous covering on the external surface of said core; and
    an adhesive layer interposed between said core and said tape and adhesively securing said winding of graphite foil tape to said discrete fibers at the outer surface of said core.

2. The packing material of claim 1, in which said adhesive layer is a coating of adhesive which has been applied to one of said graphite foil tape and said core prior to the winding of said graphite foil tape onto said core.

3. Packing material according to claim 1, including plural windings of said graphite foil tape on said core arranged in overlying relationship.

4. Packing material according to claim 3, in which each winding is of opposite hand to the next adjacent winding.

5. Packing material according to claim 1, in which said graphite foil tape is a transversely pleated foil tape.

6. Packing material according to claim 1, in which said packing material has been cut at its ends at corresponding angles and formed into an annulus with its respective ends arranged in mating relationship.

7. Packing material according to claim 6, when compressed into the form of an annulus, and in which said graphite foil tape fills the interstices between the discrete filaments of said yarns at the outer surfaces of said annulus, and forms an impervious fluid barrier at the outer surfaces of said annulus.

8. Packing material according to claim 1, in which said discrete fibers are graphite fibers having a carbon content of at least 98.2%.

9. Packing material according to claim 1, in which said discrete fibers are carbon fibers having a carbon content of up to 98.2%, and preferably of 95%.

10. Packing material according to claim 1, in which said fibers are selected from a group including natural fibers and inorganic fibers.

11. Packing material according to claim 1, in which said yarns are in the form of lengths of scrim formed from said fibers.

* * * * *